(12) United States Patent
Maver

(10) Patent No.: US 8,356,928 B2
(45) Date of Patent: Jan. 22, 2013

(54) SUPPLY ASSEMBLY FOR A BEVERAGE MACHINE AND MACHINE COMPRISING SUCH AN ASSEMBLY

(75) Inventor: Assunto M. Maver, Ghisalba (IT)

(73) Assignee: Gruppo Cimbali S.p.A., Milan (IT)

( * ) Notice: Subject to any disclaimer, the term of this patent is extended or adjusted under 35 U.S.C. 154(b) by 806 days.

(21) Appl. No.: 12/443,622

(22) PCT Filed: Sep. 19, 2007

(86) PCT No.: PCT/IB2007/053794
§ 371 (c)(1),
(2), (4) Date: Sep. 8, 2009

(87) PCT Pub. No.: WO2008/038192
PCT Pub. Date: Apr. 3, 2008

(65) Prior Publication Data
US 2010/0067322 A1   Mar. 18, 2010

(30) Foreign Application Priority Data
Sep. 29, 2006   (IT) .............................. BG2006A0047

(51) Int. Cl.
*B01F 15/02* (2006.01)
*A47J 31/46* (2006.01)
(52) U.S. Cl. ........ 366/144; 366/189; 366/195; 366/196; 99/323.3; 222/145.6; 222/129.1
(58) Field of Classification Search ............... 366/132, 366/144, 189, 195, 196; 99/287, 323.3; 222/145.6, 222/129.1
See application file for complete search history.

(56) References Cited

U.S. PATENT DOCUMENTS

| | | | | |
|---|---|---|---|---|
| 3,012,763 A | * | 12/1961 | Martin | 416/222 |
| 3,266,670 A | * | 8/1966 | Brooks et al. | 222/54 |
| 4,172,669 A | * | 10/1979 | Edelbach | 366/181.1 |
| 4,185,927 A | * | 1/1980 | Uttech | 366/131 |
| 4,193,522 A | * | 3/1980 | Edelbach | 222/145.6 |
| 4,324,494 A | | 4/1982 | Pryor et al. | |
| 4,595,131 A | * | 6/1986 | Ruskin et al. | 222/640 |
| 5,918,768 A | * | 7/1999 | Ford | 222/113 |

(Continued)

FOREIGN PATENT DOCUMENTS
EP   1639924   3/2006
(Continued)

*Primary Examiner* — Tony G Soohoo
(74) *Attorney, Agent, or Firm* — Connolly Bove Lodge & Hutz LLP

(57) ABSTRACT

The present invention relates to a supply assembly for use in the manufacture of a machine for preparing a beverage obtained by dissolving a soluble preparation in water. The invention also relates to a beverage machine that comprises said supply assembly. The supply assembly (1) according to the invention comprises a mixing chamber (10) containing a mixer (11) comprising at least one impeller (HA) for mixing a single dose of soluble preparation in a quantity of water in order to obtain said beverage. At least one nozzle (20) is provided for the insertion of said water inside said mixing chamber (10) which comprises an upper opening (15) directly accessible to a user for the manual insertion of a single dose of soluble preparation. The mixing chamber (10) also comprises a lower opening (16) suitable for enabling the supply of the beverage in a direction substantially parallel to the axis of rotation (99) of the impeller (HA) that is positioned so as to be faced and adjacent to the lower opening (16) so that, during and as a result of its rotation, it prevents the beverage from escaping.

20 Claims, 6 Drawing Sheets

U.S. PATENT DOCUMENTS

| | | | | |
|---|---|---|---|---|
| 5,975,357 A * | 11/1999 | Topar | | 222/56 |
| 6,729,753 B2 * | 5/2004 | Artman et al. | | 366/164.6 |
| 7,934,866 B2 * | 5/2011 | Koopman et al. | | 366/165.3 |
| 8,151,693 B2 * | 4/2012 | Sala et al. | | 99/287 |
| 2010/0067322 A1 * | 3/2010 | Maver | | 366/132 |

FOREIGN PATENT DOCUMENTS

| | | |
|---|---|---|
| EP | 1688073 | 8/2006 |
| GB | 2345252 | 7/2000 |
| WO | WO-03041546 | 5/2003 |

* cited by examiner

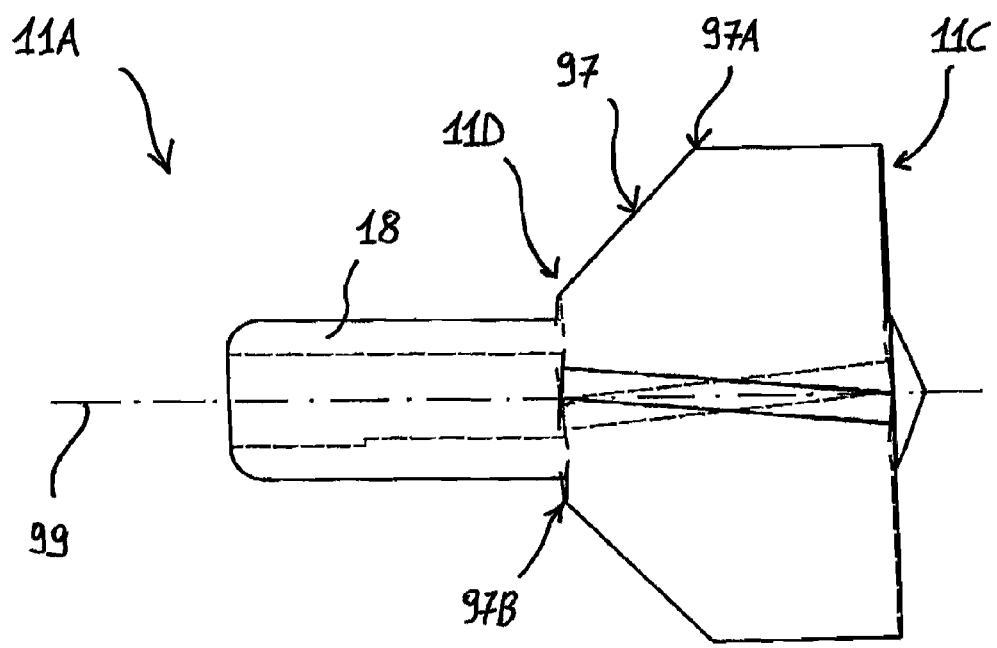
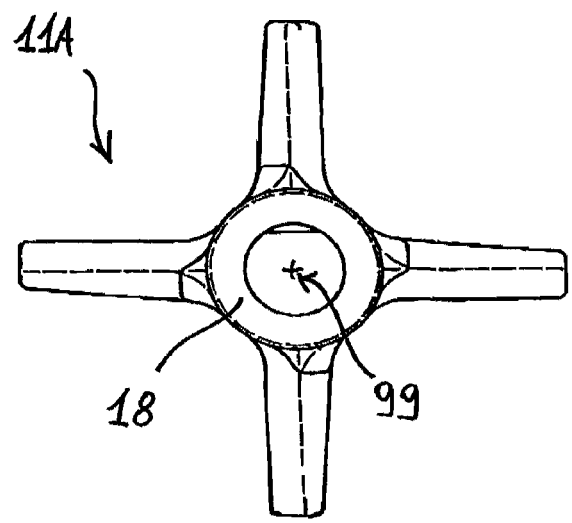
Fig. 6A
Fig. 6

SUPPLY ASSEMBLY FOR A BEVERAGE MACHINE AND MACHINE COMPRISING SUCH AN ASSEMBLY

CROSS REFERENCE TO RELATED APPLICATIONS

This application is a National Stage of PCT/IB2007/053794 filed Sep. 19, 2007 which in turn claims priority from Italian Application BG2006A000047 filed Sep. 29, 2006, the entire contents of which are incorporated herein by reference.

The present invention relates to a supply assembly preferably for use in the manufacture of a machine for supplying beverages obtained by dissolving a soluble preparation in water. The invention also relates to a beverage machine comprising such as supply assembly.

It is common knowledge that machines are used to supply beverages obtained by dissolving a soluble preparation in water that is usually heated. In their conventional version, these machines consist of a first set of components, designed to supply the beverage, which essentially comprises a mixing chamber containing a mixer that rotates to dissolve the preparation in the water. This mixing chamber is provided with a supply element complete with obstruction means for preventing the beverage escape during the mixing process. A second set of components is designed to heat the water before it is added to the mixing chamber. This second set usually comprises pumping means for pumping the water from a tank to a heater to enable the water to be heated. The structure of such conventional machines is completed with a container for storing the soluble preparation. Dosing means are also associated with said container to dose the required dose of the soluble preparation to the mixing chamber.

The beverage is usually prepared by means of a first step in which the dosing means place the powder in the mixing chamber, a second step in which the heated water is added, and a third step in which the two substances are mixed together. The obstruction means associated with the supply element are subsequently disabled to enable the delivery of the beverage. These operating steps are traditionally managed by an electronic board that actives the various components in the required sequence to perform the beverage supply or to perform a simple washing of the mixing chamber.

Although they are relatively effective from the functional standpoint, these conventional machines have several evident drawbacks. As explained above, the flow of water into the mixing chamber encounters a mixer that stirs the fluid in order to dissolve the powder preparation in the water. In many cases, however, the resulting beverage tends to flow due to the effect of gravity towards the supply element instead of remaining close to the mixer. This prevents the mixer from thoroughly and evenly mixing the beverage. This drawback is particularly noticeable when a well "shaken" beverage is required.

A second drawback of the conventional machines is provided by the considerable number of components needed to complete the various steps involved in the preparation and subsequent supply of the beverage. As explained above, these components are controlled by an electronic board, which is necessarily rather complicated because of the considerable number of operating steps that it has to manage. This aspect has a heavy fallout on the final manufacturing costs, which are already high because of the large number of components used in the preparation of the beverage.

Another drawback of the beverage machines currently used is connected to their limited "functional versatility", in the sense of their suitability for preparing different beverages. In other words, the conventional machines can be defined as "single-purpose" machines, in that they are only capable of supplying one type of beverage depending on the powder preparation contained in the storage container. To obtain a different beverage, the user is obliged to fill the storage container with a different preparation, usually after cleaning the container.

From the above considerations, there is clearly a need to realise beverage machines that effectively enable the user to obtain a beverage starting from a "single dose" of a soluble preparation. In particular, there is an evident need to realise a new supply assembly with a structural design and operating principle that enables users to enjoy the beverage of their choice without demanding any complicated preparatory procedures.

Thus, the main technical aim of the present invention is to provide a supply assembly for a beverage machine that enables the above-mentioned drawbacks to be overcome.

Within the context of said technical aim, one object of the present invention is to provide a supply assembly that enables a user to obtain a beverage starting from a single dose of soluble preparation, without requiring any complicated preparatory procedures.

Another object of the present invention is to provide a supply assembly that can be operated using straightforward electronics, which are readily and inexpensively available on the market.

Another object of the present invention is to provide a supply assembly consisting of a limited number of easily assembled components.

Another, not necessarily last object of the present invention is to provide a supply assembly that is reliable and easy to manufacture at competitive costs.

This technical aim and these and other objects that will become apparent from the description that follows are achieved by a supply assembly for a beverage machine comprising:
  a mixing chamber;
  a mixer comprising at least one impeller located inside the mixing chamber for mixing a single dose of soluble preparation in a previously-established quantity of water;
  at least one nozzle for introducing the water into the mixing chamber.

The supply assembly according to the invention is characterised in that the mixing chamber comprises an upper opening, directly accessible to a user for inserting a single dose of soluble preparation, and a lower opening suitable for supplying the beverage in a direction substantially parallel to the axis of rotation of the impeller. In particular, said impeller is positioned facing the lower opening so as to prevent, due to the effect of its rotation, the escape of the beverage from the mixing chamber during the mixing process.

The supply assembly according to the invention advantageously enables a user to place a single dose of soluble preparation directly inside the mixing chamber thanks to the upper opening provided in said chamber. This feature clearly gives the supply assembly, and consequently also the machine to which it is attached, a marked functional versatility. In fact, users can choose which beverage they require simply by selecting the single dose of powdered preparation to place in the mixing chamber, without the need for any particular preparatory procedures.

Further characteristics and advantages of the invention will emerge more clearly from the description of preferred, but not exclusive embodiments of the supply assembly according to the invention, a non-limiting example of which is shown in the attached drawings, wherein:

FIGS. 6 and 6A are side views of the impeller shown in FIG. 5.

Figure 1:
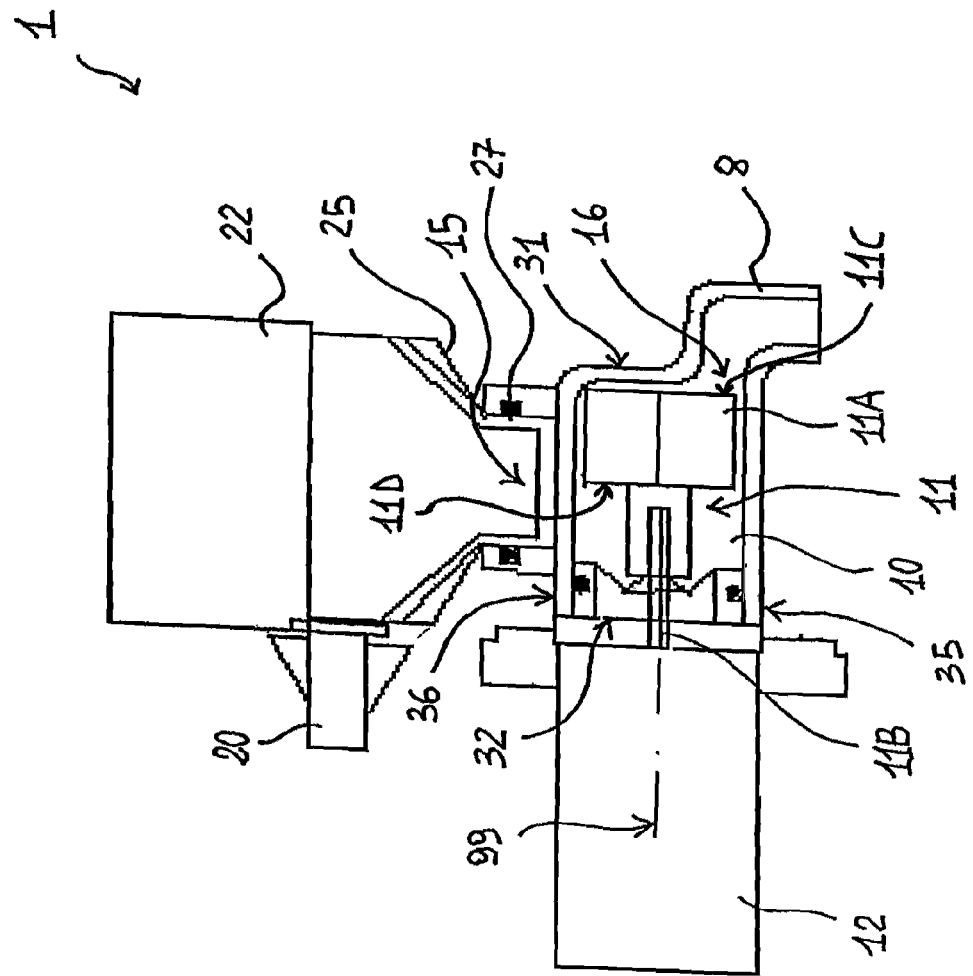
FIG. 1 is a view of a possible embodiment of a supply assembly according to the invention.

Referring now to the above-mentioned figures, the supply assembly 1 according to the invention comprises a mixing chamber 10 containing a blade-mixer 11 for mixing a single dose of a soluble preparation in a quantity of water. More precisely, the mixer consists of an blade-impeller 11A that is rotated by means of a shaft 11B of an electric motor 12, operatively located on the outside of the mixing chamber 10. By means of its rotation, the impeller 11A dissolves the preparation in the water, substantially producing the beverage required by the user. A nozzle 20 is provided to introduce preferably heated water into the mixing chamber through a feeding assembly 65 incorporated in a beverage machine 2, to which the supply assembly is operatively connected.

The supply assembly 1 according to the invention is characterised in that the mixing chamber 10 comprises an upper opening 15 that is accessible to the user to enable the user to manually insert a single dose of his/her chosen soluble preparation. In particular, the upper opening 15 is "accessible to the user" in the sense that the user can pour the contents of said single dose of preparation directly into the mixing chamber 10, differently from what happened in traditional supply assemblies, in which dosing means associated with a storage container are used for this purpose.

The mixing chamber 10 also comprises a lower opening 16 provided to enable the supply of the beverage into a collection element, which may be a normal cup. In particular, said lower opening 16 is designed to enable the supply of the beverage according to a direction substantially parallel to the axis of rotation of the impeller 11A of the mixer 11. According to the invention, moreover, said impeller 11A is located in the face of the lower opening 16 so that, due to the effect of its rotation, it prevents the escape of the beverage through said opening. In fact it has been demonstrated that in this position the impeller 11A, by means of its blades, mixes the beverage by spinning it according to directions slanting with respect to the axis of rotation 99. In other words, the impeller 11A mixes the beverage and, at the same time, it prevents the beverage from moving in the direction of its axis of rotation 99, i.e. towards the lower opening 16.

Obviously, when the impeller 11A is disabled this obstruction effect is lost and the beverage can thus flow freely through the lower opening 16 into the cup in which it is collected.

Clearly, the above-described technical solution is extremely advantageous in that it exploits an element needed for the mixing process, i.e. the impeller 11A, to serve a purpose traditionally served by specific obstruction means, which need control means for preventing or enabling the supply of the beverage.

FIG. 1 is a cross-sectional view of a supply assembly 1 according to the invention and identifies further technical characteristics of the present invention. According to a preferred embodiment, the impeller 11A is located in the mixing chamber 10 so that its axis of rotation 99 is substantially orthogonal to a first surface 31 of said chamber on which the lower opening 16 is defined. More precisely, in order to increase said obstruction effect, the impeller 11A is arranged so that its first terminal portion 11C (see FIG. 4) is faced and adjacent to the first surface 31 so as to restrict the gap between the two parts (i.e. between the first surface 31 and the first terminal portion 11C of the impeller 11A) as far as possible.

The impeller 11A is also positioned so that one its second terminal portion 11D, opposite to the first terminal portion 11 C, faces a second surface 32 of the mixing chamber 10, opposite to said first surface 31. More precisely, the impeller 11A is placed so that its first terminal portion 11C is faced and adjacent to the lower opening 16, while the second terminal portion is faced to the second surface 32, with a gap between them that defines a mixing space.

The mixing space (defined between the second terminal portion 11D of the impeller and the second surface 32) is in communication with the upper opening 15 and is consequently separated from the lower opening 16 by means of the impeller 11A that, when it is rotating, obstructs the flow of the beverage towards said lower opening 16. The position of the impeller 11A and its rotation consequently contribute to both mixing the beverage and obstructing the flow of said beverage towards the lower opening 16, due to the effect of said rotation.

Figure 5:
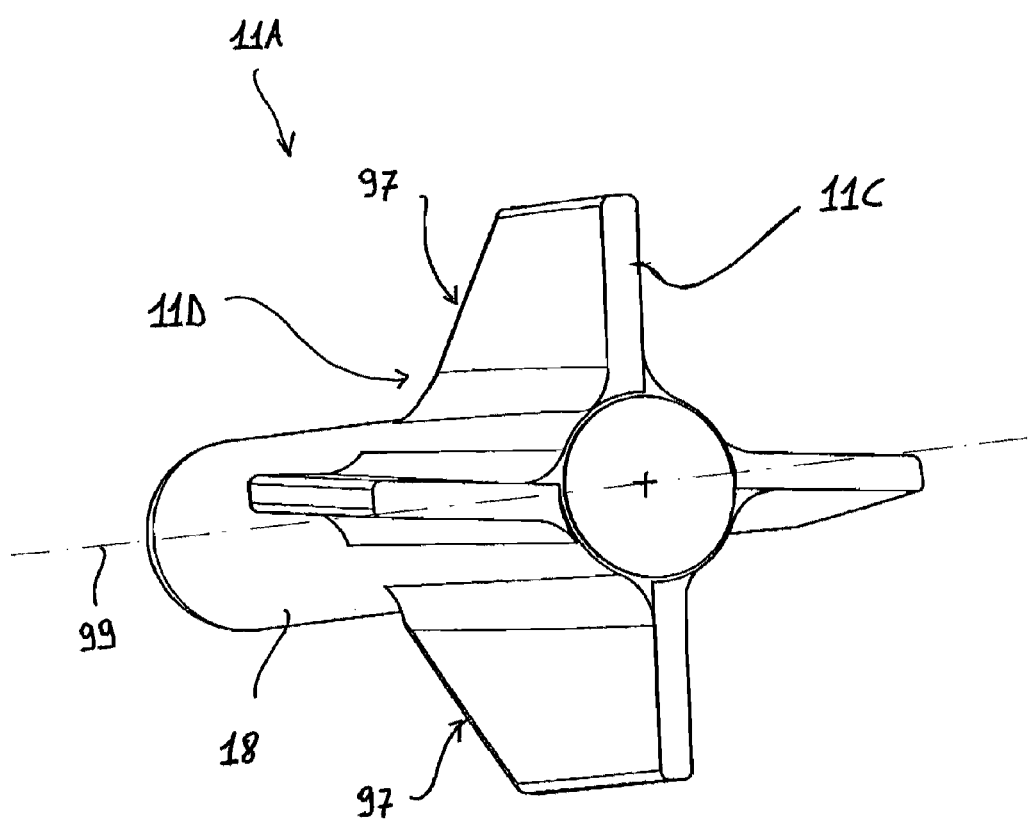
FIG. 5 is a perspective view of an impeller in a supply assembly according to the present invention.

It has also been demonstrated that said obstruction effect can be further improved by using an impeller 11A provided with blades that extend according to slanting directions with respect to the axis of rotation 99 of said impeller, as shown in FIG. 5 for instance. The slanting gradient of the blades optimises the obstructing effect versus the movement of the beverage towards the lower opening, during the rotation of the impeller 11A of course.

According to a preferred embodiment of the invention, shown in FIGS. 5 and 6, the blades each have a bevelled edge 97 coinciding with the second terminal portion 11D of the impeller 11A for the purpose of improving the mixing of the beverage. As shown, said bevelled edge 97 extends preferably from the edge 97A of the blade to its base 97B. It has been demonstrated that this configuration improves the mixing and homogenisation of the end product.

With reference once again to FIG. 1, the electric motor 12 for operating the impeller 11A is connected to the mixing chamber 10 in correspondence of the second surface 32 which is opposite to the first surface 31. More precisely, said connection is provided so that of the axis of rotation 99 of the impeller 11A is substantially orthogonal to the second surface 32.

As shown again in FIG. 1, the impeller 11A is connected to the shaft 11B of the electric motor 12 by means of an axial connection portion 18 that extends from the second terminal portion 11D of the impeller 11A, as shown clearly, for instance, in FIG. 6. Said solution advantageously helps to increase the stiffness of the impeller and facilitate its installation on the shaft 11B of the motor 12.

The supply assembly 1 preferably also comprises connection means 88 for its installation on a beverage machine 2 to which the supply assembly 1 is applied. In particular, said connection means 88 enable the mixing chamber 10 to be positioned so that the axis of rotation 99 of the impeller 11A lies in a substantially horizontal direction.

Figure 3:
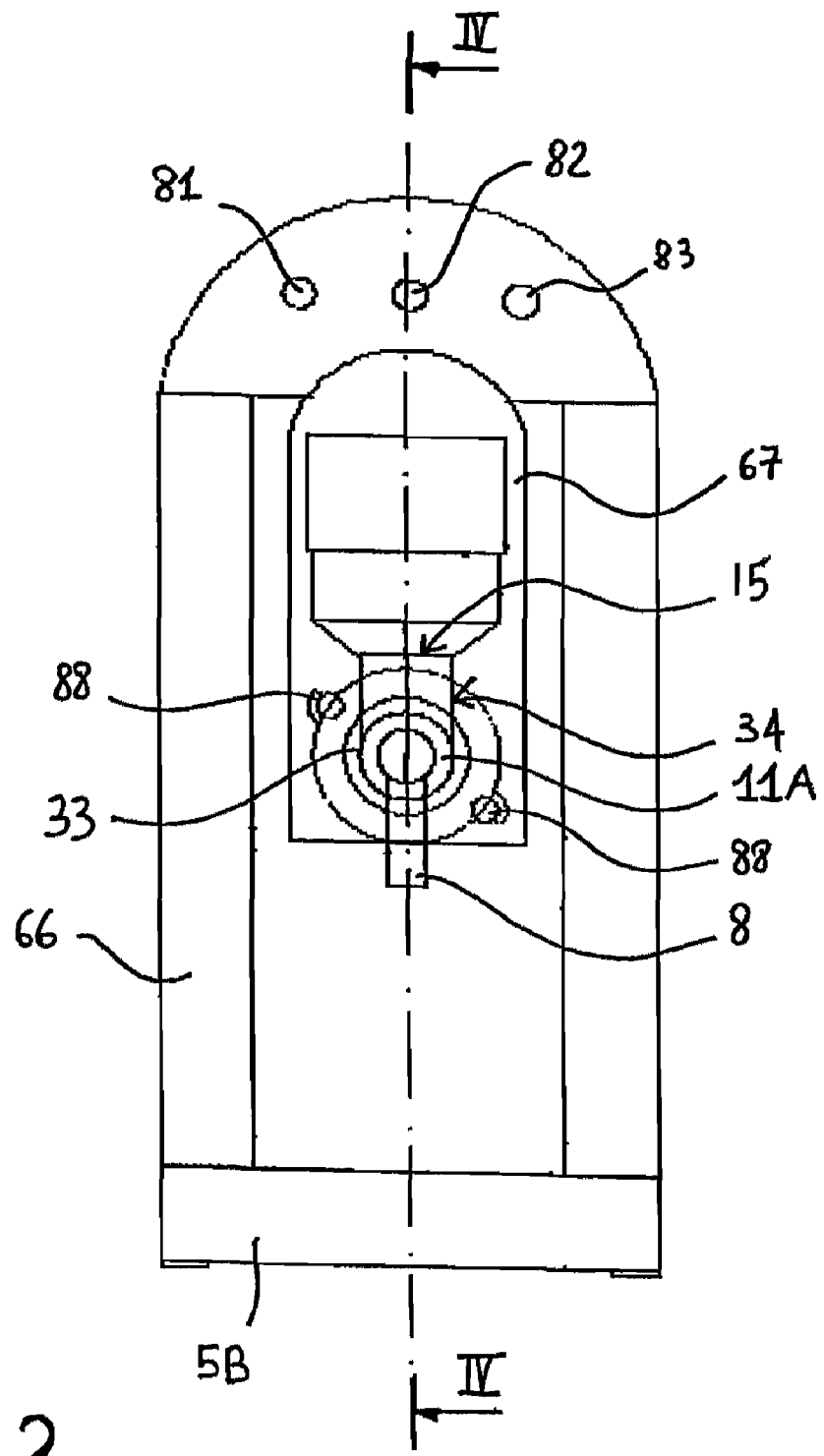
FIG. 3 is a front view of the beverage machine shown in FIG. 2.

According to a preferred embodiment of the invention, the mixing chamber 10 comprises a third surface 33 and a fourth surface 34 substantially parallel to one another and arranged so as to be orthogonal to the first surface 31 and the second surface 32. Referring now to FIG. 3, as described in more detail later on, the impeller 11A is located inside the mixing chamber 10 so that its axis of rotation 99 lies parallel to said second and third lateral surfaces 32 and 33.

The mixing chamber 10 preferably also comprises a fifth surface 35 shaped to obtain a semicylindrical profile to provide a bottom for said chamber. Said fifth surface 35 extends according to a direction substantially orthogonal to the first and second surfaces 31 and 32, i.e. according to a direction parallel to that of the impeller 11A in its assembled position. The fifth surface 35 preferably has a slightly greater radius of curvature than that of the blades of the impeller 11A so as to reduce the gap existing between said blades and said fifth surface 35 to a minimum.

According to the same principle, the third surface 33 and the fourth surface 34 also lie at a distance from one another that is slightly wider than the diameter of the impeller 11A thereby constituting an extremely compact mixing chamber 10 that enables a uniform and thorough mixing of the beverage. A sixth surface 36, visible in FIG. 1, lies substantially opposite the previously defined fifth surface 35, to complete the structure of the mixing chamber 10 at the top, and at the same time to define the first opening 15 needed to insert a single dose of soluble preparation. All the surfaces comprising the mixing chamber 10 can advantageously be made in a single piece, made of a plastic material for instance, by advantageously exploiting well-known industrial moulding processes.

According to a preferred embodiment, and again as shown in FIG. 1, the supply assembly 1 advantageously also comprises a supply element 8 associated with the lower opening 16 for the purpose of guiding the beverage being supplied effectively towards a cup for it collection. As shown, said supply element 8 can advantageously be made in a single body with said mixing chamber 10, or it can be made separately and only subsequently attached to the lower opening 16.

The supply assembly 1 according to the invention preferably comprises a cover element 44 designed to be associated with the upper opening 15 for the purpose of avoiding any splashes of water and/or powder escaping from the chamber 10 due to the rotation of the impeller 11A. According to a preferred embodiment of the invention, as clearly shown in FIG. 4, the supply assembly 1 preferably also comprises a funnel 22 to facilitate the insertion of the single dose of soluble preparation in the mixing chamber 10. Said funnel 22 advantageously comprises a first extremity 22A suitable for being operatively connected to the upper opening 15 of the mixing chamber 10, with the aid of sealing means 27 interposed between the two. The funnel 22 comprises at least one conical portion 25 tapered towards the first extremity 22A for the purpose of facilitating the insertion of the single dose of powder in the mixing chamber 10.

In this particular embodiment of the invention, the cover element 44 is operatively and removably associated with a second extremity 22B of the funnel 22, substantially opposite the previously defined first extremity 22A. Moreover, the delivery nozzle 20 used to deliver water into the mixing chamber 10 is advantageously mounted on the wall of said funnel 22, with obvious advantages in terms of its ease of manufacture.

Figure 2:
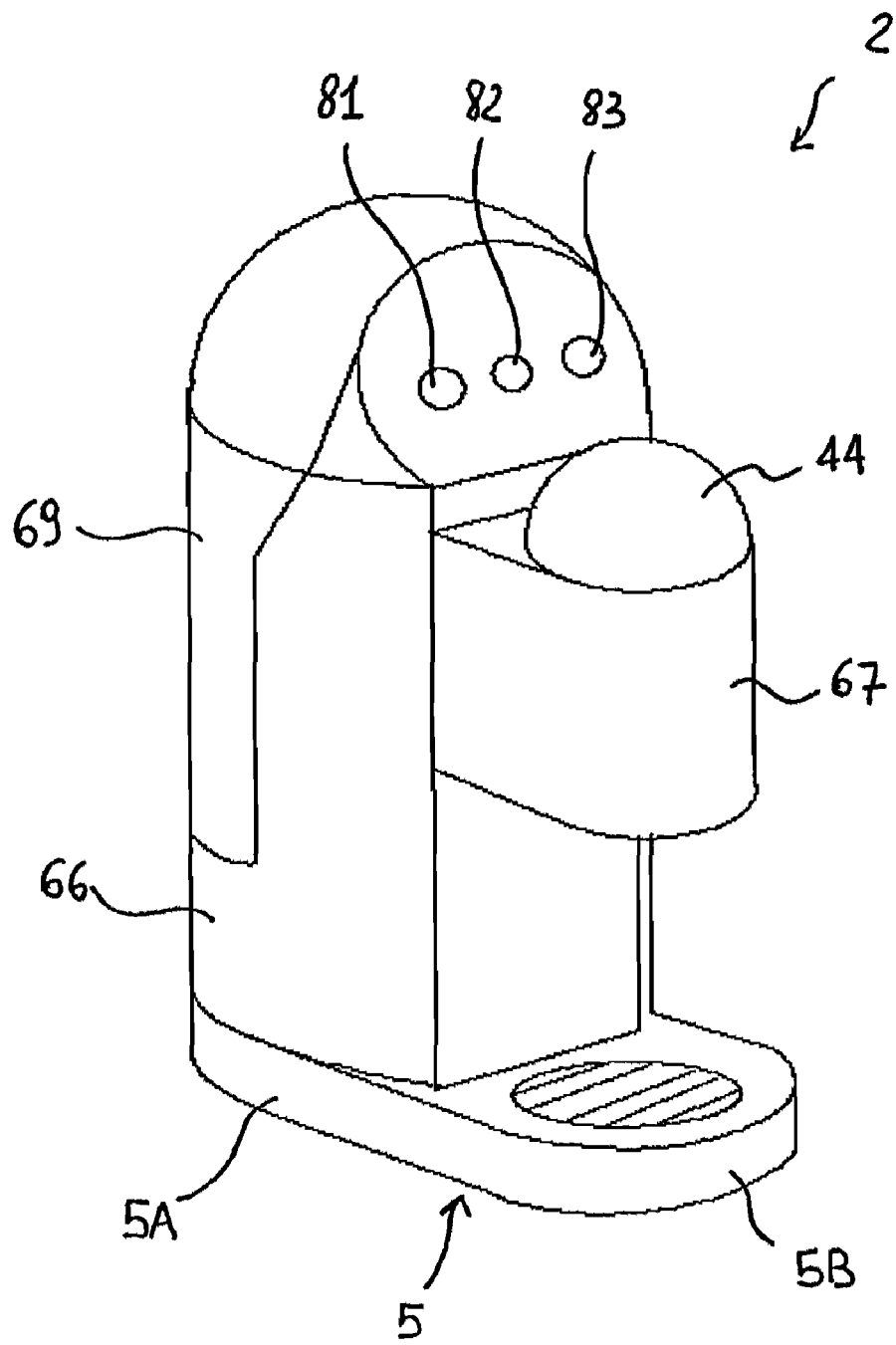
FIG. 2 is a perspective view of a beverage machine comprising a supply assembly according to the invention.

The present invention also relates to a beverage machine characterised in that it comprises a supply assembly 1 according to the present invention. FIG. 2 shows a possible embodiment of the machine according to the invention, which comprises a first housing 66 for containing the feeding assembly 65 designed to serve the nozzle 20 of the supply assembly 1. At least a portion 69 of the first housing 66 is removable to enable the user to fill a tank 51 provided for the purpose of water storage.

A second housing 67 contains the parts forming the supply assembly 1, as described above. The machine 2 also comprises a base 5 designed to support, on its rear part 5A, the first housing 66 and a cup 47 for collecting the products delivered by the machine 2 on its front part 5B.

FIG. 3 is a front view of the beverage machine 2, as shown in FIG. 2, showing the layout of the various above-described surfaces (particularly the third surface 33, the fourth surface 34 and the fifth surface 35) comprising the mixing chamber 10. In particular, it shows how the horizontal position of the impeller (determined by the orthogonality of its axis of rotation 99 with respect to the first and second surfaces 31 and 32 of the mixing chamber 10) advantageously enables the soluble preparation to be retained inside the mixing chamber 10 after it has been poured through the upper opening 15. In other words, this horizontal arrangement prevents the soluble preparation from escaping through the lower opening 16 before the mixing process begins. Moreover, said horizontal position enables the impeller to exert an effective mixing and obstructing action, as explained above.

Figure 4:
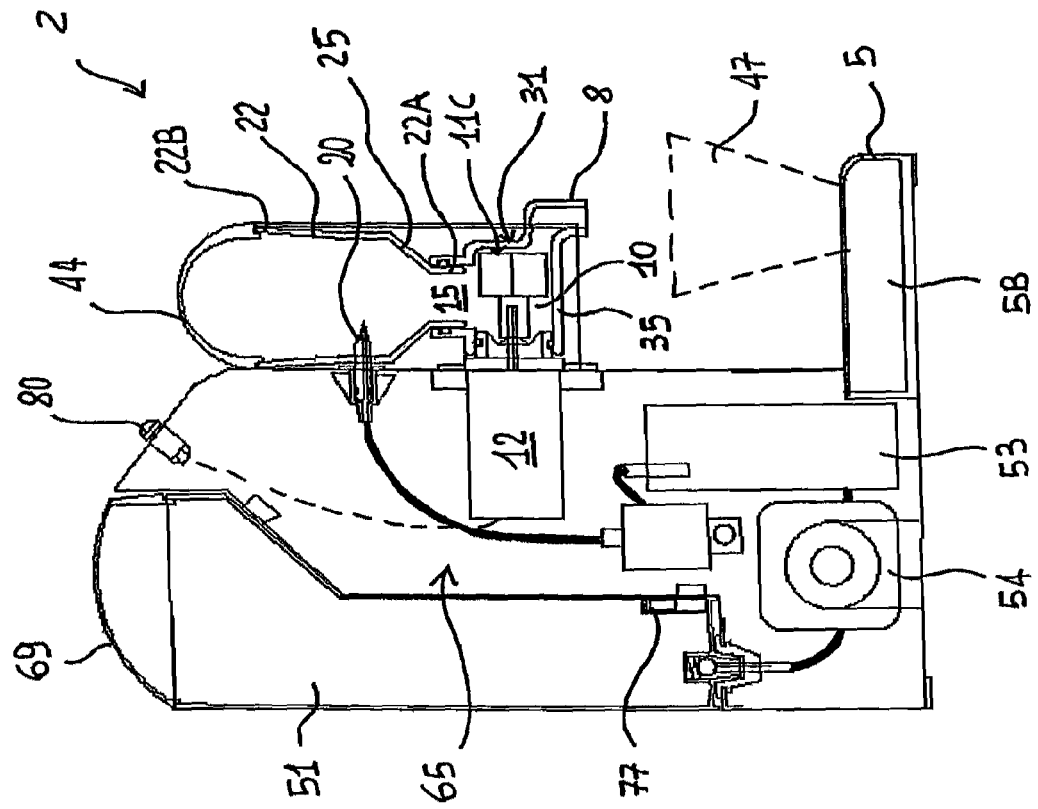
FIG. 4 is a cross-sectional view along IV-IV of FIG. 3.

FIG. 4 is a cross-sectional view along IV-IV showing some of the components in the feeding assembly 65 of the machine 2 according to the invention. More in detail, the latter comprises at least one tank 51 designed to contain water and preferably complete with means 77 for warning the user when the water level is exhausted. The feeding assembly 65 also comprises a boiler 53, the outlet of which is operatively connected, preferably by means of a solenoid valve 57, to said nozzle 20 for the insertion of the water into said mixing chamber 10. Suitable pumping means 54 are provided between the tank 51 and the boiler 53 to give the water the pressure needed for it to reach the nozzle 20.

The beverage machine 2 comprises an actuating unit 80 designed to enable the operation of the feeding assembly 65 and of the mixer 11 of the supply assembly 1. With reference, for instance, to FIG. 2, the actuating unit 80 comprises at least a first actuator 81 for actuating the rotation of the mixer 11 and the supply of a first pre-set quantity of water into the mixing chamber 10. The actuating unit 80 may also comprise a second actuator 82 for actuating the rotation of the mixer 11 and the supply of a second pre-set quantity of water in addition to the first quantity delivered by the first actuator 81. The presence of two actuators with said functions enables users to obtain a more or less "concentrated" beverage to suit their personal preference.

According to a preferred embodiment, the actuating unit 80 may advantageously also comprise a third actuator 83 to actuating the supply of a third pre-set quantity of water, preferably different from the previous two, that can be used, for instance, to wash the mixing chamber 10 and/or the funnel 22 connected thereto.

Given the limited number of components involved, it is easy to see that the actuating unit 80 is relatively straightforward and consequently more reliable. From a practical viewpoint, it can consist, for instance, of an electronic board readily available on the market at low cost.

From the above considerations it is clear that the beverage machine 2 according to the invention is based on an extremely straightforward operating principle that assures the machine an excellent functional versatility. To obtain a coffee-flavoured beverage, for instance, users simply have to pour a single dose of soluble instant coffee preparation into the mixing chamber 10 through the opening 15 and, if they wish, exploiting the presence of a funnel 22. Then users can operate the first actuator 81 or the second actuator 82 to select the amount of water in which to dissolve the single dose of preparation, prompting the mixing of the beverage at the same time. At the end of the supply phase, a user can advantageously operate the third actuator 83 to wash the mixing chamber 10. Such as washing action is particularly useful in the event of the machine 2 subsequently being used to supply different beverages.

Clearly, the technical features of the supply assembly also advantageously enable its use for mixing cold beverages, such as milkshakes or the like. In the case of milkshakes, for instance, the milk required can be advantageously dosed in the mixing chamber through the upper opening together with the other ingredients and then shaken inside the mixing chamber. The nozzle can advantageously be used to inject water at the end of the supply of the milkshake in order to wash the mixing chamber.

The technical solutions adopted for the supply assembly according to the invention enable the previously-stated technical aim and objects to be achieved. In particular, the supply assembly according to the invention enables users to obtain a beverage starting from a single dose of soluble preparation and consequently provides the machine, to which it is attached, with a marked functional versatility. The supply assembly according to the invention also comprises a limited number of components that are easy to assemble together with obvious advantages from the point of view of the final manufacturing costs. In practical terms, the components may be made of any material and in any contingent shape and size, according to need and the state of the art.

The invention claimed is:

1. A supply assembly for machines used for the preparation and supply of a beverage comprising: a mixing chamber; a mixer comprising at least one impeller positioned inside said mixing chamber for mixing a single dose of a soluble preparation in a previously-established quantity of water; at least one nozzle for introducing said water inside said mixing chamber; wherein said mixing chamber comprises an upper opening for the insertion of said single dose of soluble preparation, said mixing chamber also comprising a lower opening for supplying said beverage in a direction substantially parallel to an axis of rotation of said impeller, said impeller of said mixer being positioned facing said lower opening so as to prevent the escape of said beverage through said lower opening due to the effect of its rotation, said impeller being located in said mixing chamber with the axis of rotation substantially orthogonal to a first surface of the mixing chamber on which it is defined said lower opening, said impeller comprising a second terminal portion, opposite to a first terminal portion facing said first surface, facing a second surface of the mixing chamber opposite to said first surface; a gap between said second terminal portion of said impeller and said second surface of the mixing chamber defining a mixing space, said upper opening of the mixing chamber being placed above said mixing space and being in fluid communication with a first extremity of a funnel designed for the manual introduction of said single dose of soluble preparation.

2. A supply assembly according to claim 1, wherein it comprises connection means for connecting said mixing chamber to a beverage machine.

3. A supply assembly according to claim 1, wherein said impeller is rotated by a shaft of an electric motor located on the outside of said mixing chamber, said electric motor being connected to said mixing chamber in correspondence of said second surface opposite to said first surface.

4. A supply assembly according to claim 1, wherein said impeller has blades that extend in a slanting direction with respect to said axis of rotation.

5. A supply assembly according to claim 4, wherein said blades have a bevelled edge in correspondence of said second terminal portion of said impeller.

6. A supply assembly according to claim 4, wherein said impeller is connected to said shaft of said motor by means of an axial connection portion that extends from said second terminal portion of said impeller.

7. A supply assembly according to claim 1, wherein said mixing chamber comprises a third surface and a fourth surface substantially orthogonal to said first surface, said impeller of said mixer being positioned so that its axis of rotation is substantially parallel to said third surface and to said fourth surface of said mixing chamber.

8. A supply assembly according to claim 7, wherein said mixing chamber comprises a fifth surface shaped to form a substantially semicylindrical profile, said upper opening being defined on a sixth surface substantially opposite said shaped fifth surface.

9. A supply assembly according to claim 1, wherein it comprises a supply element associated with said lower opening designed to guide said beverage towards a cup for its collection.

10. A supply assembly according to claim 9, wherein said supply element is made in a single body with said mixing chamber.

11. A supply assembly according to claim 1, wherein it comprises a cover element operatively associated with said upper opening to prevent any escaping of said beverage from said mixing chamber during the rotation of said impeller.

12. A supply assembly according to claim 11, wherein said cover element is operatively and removably connected to a second extremity of said funnel substantially opposite said first extremity.

13. A supply assembly according to claim 11, wherein said nozzle for the delivery of said pre-established quantity of water is installed on a wall of said funnel.

14. A supply assembly according to claim 11, wherein said funnel has at least one conical portion tapered towards said first extremity.

15. A beverage machine comprising a supply assembly according to claim 1.

16. A beverage machine according to claim 15, comprising a feeding assembly having: a tank for the storage of said water; a boiler for heating said water operatively connected at its inlet to said tank and at it outlet to said nozzle forming part of said supply assembly so as to introduce heated water into said mixing chamber; pumping means for transferring said water from said tank to said boiler, and then to said nozzle.

17. A beverage machine according to claim 16, wherein it comprises a actuating unit designed to operate said feeding assembly and said mixer of said supply assembly.

18. A beverage machine according to claim 17, it comprises a first actuator for actuating the rotation of said mixer and for actuating the supply of a first pre-set quantity of water from said feeding assembly into said mixing chamber.

19. A beverage machine according to claim 18, wherein it comprises a second actuator for actuating the rotation of said mixer for actuating the supply of a second pre-set quantity of water, different from said first pre-set quantity, from said feeding assembly into said mixing chamber.

20. A beverage machine according to claim 17, wherein it comprises a third actuator for actuating the supply of a third pre-set quantity of water, different from said first and second quantities of water, from said feeding assembly into said mixing chamber for the purpose of washing said chamber.

* * * * *